(12) United States Patent
Fite, Jr. et al.

(10) Patent No.: US 6,496,502 B1
(45) Date of Patent: *Dec. 17, 2002

(54) DISTRIBUTED MULTI-LINK TRUNKING METHOD AND APPARATUS

(75) Inventors: David B. Fite, Jr., Northborough, MA (US); Nicholas Ilyadis, Pepperell, MA (US); Ronald M. Salett, Framingham, MA (US)

(73) Assignee: Nortel Networks Limited, St. Laurent (CA)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/106,801

(22) Filed: Jun. 29, 1998

(51) Int. Cl.[7] .............................. H04J 3/24; H04J 12/56; H04L 1/22; H04L 12/28; H04K 1/10
(52) U.S. Cl. ...................... 370/389; 370/338; 370/351; 370/384; 370/401
(58) Field of Search ................................. 370/389, 216, 370/254, 255, 218, 338, 394, 399, 401, 392, 431, 536, 235, 351, 384; 375/260; 709/223, 232, 238, 220, 221

(56) References Cited

U.S. PATENT DOCUMENTS

| 5,345,446 | A | * | 9/1994 | Hiller et al. ............... 370/60.1 |
|---|---|---|---|---|
| 5,452,297 | A | * | 9/1995 | Hiller et al. ............... 370/60.1 |
| 5,784,357 | A | * | 7/1998 | Wolker et al. .............. 370/218 |
| 5,892,932 | A | * | 4/1999 | Kim ........................... 395/311 |
| 5,949,788 | A | * | 9/1999 | Friedman et al. ........... 370/431 |
| 6,016,310 | A | * | 1/2000 | Muller et al. ............... 370/255 |
| 6,049,528 | A | * | 4/2000 | Hendel et al. .............. 370/235 |
| 6,151,297 | A | * | 11/2000 | Congdon et al. ........... 370/216 |
| 6,175,868 | B1 | * | 1/2001 | Lavian et al. ............... 709/223 |
| 6,226,290 | B1 | * | 5/2001 | Salett et al. ................ 370/389 |

* cited by examiner

*Primary Examiner*—Wellington Chin
*Assistant Examiner*—M. Phan
(74) *Attorney, Agent, or Firm*—Withrow & Terranova, P.L.L.C.

(57) ABSTRACT

A method and apparatus for providing data communication between a source station having multiple connections to a first switch and a destination station having multiple connections to a second switch. A trunk identifier to each port on the first switch and each port on the second switch. A data frame is encoded with the trunk identifier for an ingress port on the first switch. The data frame is sent to the second switch from the first switch. A list of egress ports for the destination station is obtained from a station list contained in the second switch. An egress port is selected from the list of egress ports based upon the source address, destination address and trunk identifier. The data frame is sent to the destination station through the selected egress port.

14 Claims, 5 Drawing Sheets

| MEMORY SPACE | 64 BITS | NUMBER OF ENTRIES |
|---|---|---|
| 4K | VLAN MASKS (ALL ELSE) | 4K |
| 4K | VLAN MASKS (UNKNOWN MULTICAST) | 4K |
| 8K | FORWARD/FILTER/TRUNK MASKS | 4K/2K/1K* |
| 48K | ADDRESS ENTRIES | 32K |

* = BASED ON NUMBER OF TRUNK GROUPS SUPPORTED

FIG. 5

DISTRIBUTED MULTI-LINK TRUNKING METHOD AND APPARATUS

FIELD OF THE INVENTION

This invention relates generally to data communications networks, and more particularly, to a method and apparatus for trunking of physical ports that reside on different switches within the network.

BACKGROUND OF THE INVENTION

Computer networks are used to interconnect many computing resources, including computers, workstations, servers, printers, modems, and storage devices. For example, two or more computers may be connected together through a network. Network users are able to share files, printers and other resources, send messages and run applications on remote computers. An important part of any computer network includes the physical components or network communications devices used to interconnect the computing resources.

One network communications device used to interconnect multiple computing resources is a chassis-based system designed to accommodate a number of internal cards. The computing resources such as computers are coupled to the internal cards of the chassis-based system. Once the computers are coupled to the internal cards, the computers are coupled to the network. To accommodate network growth, additional internal cards may be purchased and added to the chassis-based system. With the additional internal cards installed, additional computing resources may be added to the network. A disadvantage of these chassis-based systems is that there is a relatively large initial investment when purchasing the chassis because of the large amount of overhead associated with chassis-based systems.

An alternative to expensive chassis-based systems is the use of less expensive standalone network communications devices or units that have a fixed number of ports for connecting computing resources or stations to the network. Such standalone network communications devices include stackable switches or the like. Although additional ports can not be added to each individual standalone unit, separate standalone units can be stacked, cascaded or coupled to accommodate network growth. As a result, there is a lower startup cost when establishing a computer network with the standalone units in comparison with chassis-based systems. Furthermore, network administrators still have the flexibility to increase the size of the network with the less-expensive standalone units.

FIG. 1 illustrates multiple network communications devices 103, 105, 107, 109 and 111 coupled together to form a computer network 101. Multiple computing resources (not shown) are coupled to each network communications device 103, 105, 107, 109 and 111. In one embodiment, network communications devices 103, 105, 107, 109 and 111 are stackable switches coupled together through bus 113. Bus 113 is used to tie together the switch network fabric of computer network 101. It are noted by one of ordinary skill in the art that the utilization of bus 113 is an extension of the chassis-based designs discussed earlier. The internal cards of the chassis-based systems are commonly coupled to high speed buses within the chassis-based systems.

The use of stackable switches allows network administrators to build systems having multiple physical ports to a computing resource with a high data bandwidth requirement, such as a network file server. Multiple physical ports to a single resource is known as multi-link trunking, and allows load balancing, where the network traffic to a single computing resource can be shared across the physical ports to the resource.

Known systems allow trunking to a single computing resource only if the multiple physical ports to the resource are all connected to the same network switch. However, it is common for a single computing resource to have physical ports to more than one switch. If the physical links on different switches cannot be trunked, the available bandwidth of the extra links is often wasted. In addition, unless data frames can be sent through local trunks, bandwidth is wasted because duplicate frames typically must be sent to all switches on the network. Therefore, there is a need to enable trunking of physical ports that reside on different switches within the network. There is a future need to forward data frames through local trunks.

SUMMARY OF THE INVENTION

The present invention provides a method and apparatus for providing data communication between a source station having multiple connections to a first switch and a destination station having multiple connections to a second switch. A trunk identifier to each port on the first switch and each port on the second switch. A data frame is encoded with the trunk identifier for an ingress port on the first switch. The data frame is sent to the second switch from the first switch. A list of egress ports for the destination station is obtained from a station list contained in the second switch. An egress port is selected from the list of egress ports based upon the source address, destination address and trunk identifier. The data frame is sent to the destination station through the selected egress port.

BRIEF DESCRIPTION OF THE DRAWINGS

The present invention is illustrated by way of example and may be better understood by referring to the following description in conjunction with the accompanying drawings, in which like references indicate similar elements and in which:

FIG. 5 shows a preferred CAM memory organization compatible with the present invention;

DETAILED DESCRIPTION OF AN EMBODIMENT OF THE PRESENT INVENTION

Figure 1:
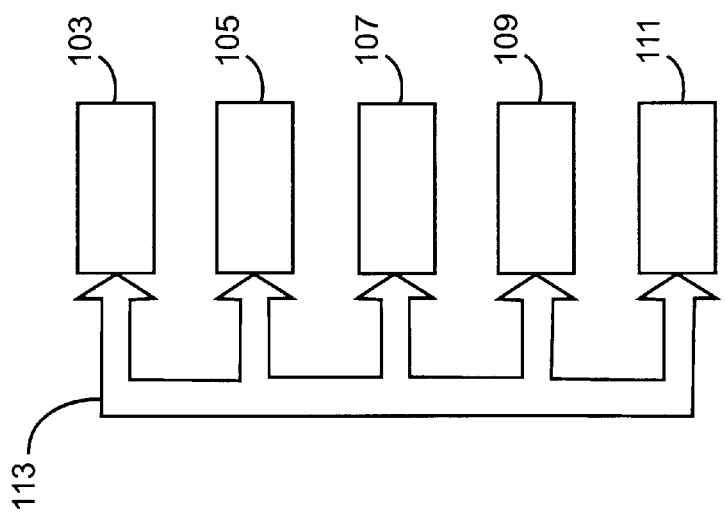
FIG. 1 shows a computer network coupled together with a bus architecture compatible with the present invention.

In the following description of an embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention. An embodiment of the present invention, described below, enables a remote computer system user to execute a software application on a network file server.

The present invention provides a way of directing a data frame to a remote link across a local data trunk to optimize the data bandwidth for a network switch. The forwarding process within an embodiment of the present system is distributed so that packet processing is performed at both the port level as well as by the content addressable memory (CAM) on the packet bus. The stack operation introduces a further level of distribution so that packets which are forwarded up the stack are processed by the CAM and ports in each destination unit.

Glossary

The following terms, phrases and definitions are used throughout the specification to describe an embodiment of the present invention.

CAM—Content addressable memory.
CAM CYCLE—A packet control word generated by the CAM for each packet indicating its destination.
CSMA/CD—Carrier sense multiple access collision detect.
DA—Destination address.
MAC—Media access control. The MAC address is that which matches either the DA or SA lookup. The same entry is used for both DA and SA though the remaining information in the entry is used in different ways.
Policy—Typically a 13-bit index used to access DA based policies for forwarding and filtering.
SA—Source address.
Source Port—The port number where an address was learned or migrated to. This is used for DA based forwarding.
TCP/IP—Transmission Control Protocol/Internet Protocol. A set of communication protocols developed by the U.S. Department of Defense that allows dissimilar computers to share information over a network.
Trunk Mask Group—Typically a four bit field that is accessed by the SA lookup to build an index to a trunk mask. This is used to provide SA based conditioning on a forwarding mask that has multiple trunk ports activated.
VLAN—Virtual local area network.
VLAN Tag—Virtual local area network tag. The VLAN tag originates from the packet an address was learned at. Each unique VLAN+SA creates a new CAM entry.

The following terms, phrases and definitions are used throughout the specification to describe trunking in an embodiment of the present invention.

Server Trunk—A trunk that attaches to a server that utilizes the same MAC address on each of its links. Network and Server Trunks can be either bounded or distributed.
Network Trunk—A trunk that attaches to another inter networking device, yielding a variety of addresses seen on each of the trunk members. The same source addresses can be seen on one or more of the trunk members. Network and Server Trunks can be either bounded or distributed.
Server Trunk—A trunk that attaches to a server that utilizes the same MAC address on each of its links. Network and Server Trunks can be either bounded or distributed.
Bounded Trunk—All ports that are members of the trunk group reside on the same stack module.
Bounded Server Trunk—All ports on the same stack module attach to a server.
Bounded Network Trunk—All ports on the same stack module attach to another switch.
Distributed Trunk—Port members of the trunk group can be distributed on different stack modules.
Distributed Server Trunk—Port members of the trunk group are distributed on different stack modules and attach to the server.
Distributed Network Trunk—Port members of the trunk group are distributed on different stack modules and attach to the switch.

Hardware Environment

Figure 2:
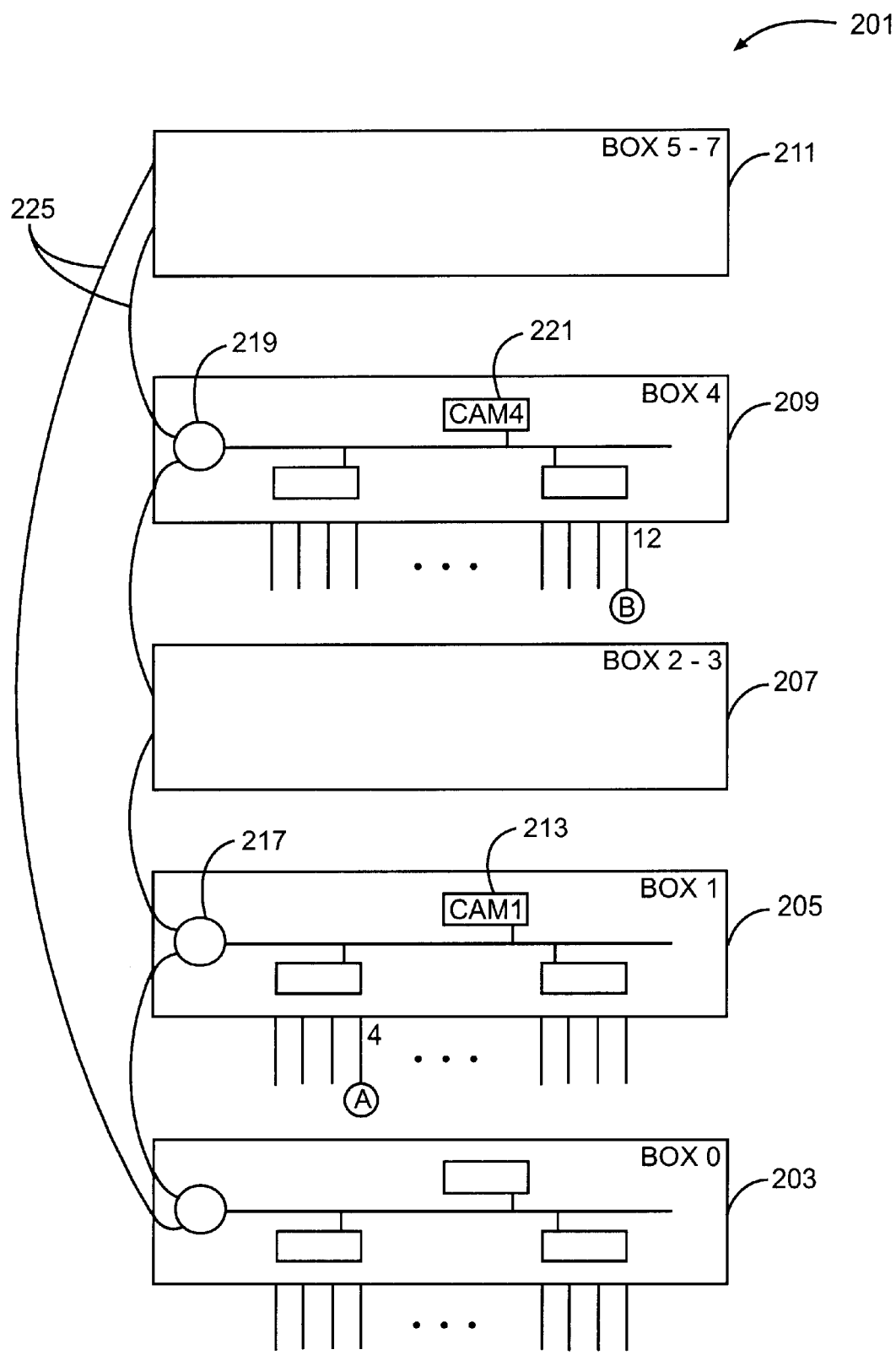
FIG. 2 shows a computer network with optimized stack memory compatible with the present invention.

As shown in FIG. 2, an embodiment of the present invention shows how a network 201 having network switches 203, 205, 207, 209, and 211 are coupled with a network bus 225. These switches may be stacked, allowing ports to be readily added to the network. Each switch contains a CAM 213, 221 which is used to direct data frames between ports on a switch or between local ports and remote switches, and to store address, port and other network information. A data transfer port 217, 219, allows the transfer of information and data frames between network switches. The operation of the CAM is discussed in greater detail below.

Figure 3:
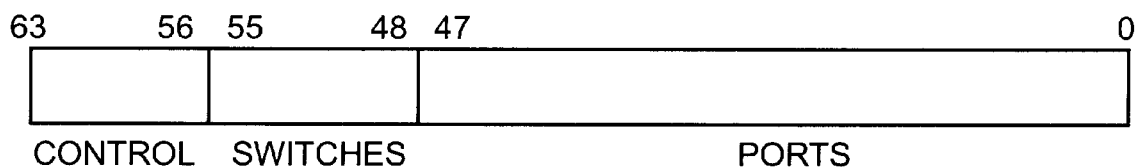
FIG. 3 shows a content addressable memory (CAM) cycle compatible with the present invention.

The present invention optimizes the memory of a network switch by storing only the port information associated with the switch and information about the other switches on the network. In one embodiment of the present invention, a 64-bit CAM cycle word is used to indicate the source and destination ports information for each packet transitioning a switch, as shown in the example in FIG. 3. Using a 64-bit word, it is possible to indicate, for example, the presence of 48 ports on the switch and eight switches total on the stack. The lower 56 bits of the 64-bit CAM cycle word, shown as bits 0–55, are preferably used to indicate the routing information for a data frame. The first 48 bits of the 64-bit CAM cycle word, shown as bits 0–47, are preferably used to indicate the destination ports, while the next eight bits, shown as bits 48–55, are preferably used to indicate the destination of up to eight switches. The remaining eight bits are used for other system and administrative purposes. The total number of ports available in a network using this mechanism is 48×8, or 384 ports.

The description of the present invention uses an example 64-bit CAM cycle word for illustration purposes only. It will be recognized that the number of ports recognizable on a switch and the maximum number of switches on a network may be increased or decreased by changing size of the CAM cycle word or changing the contents of the CAM cycle word without loss of compatibility with the present invention. It will also be recognized that the contents of the CAM cycle word may be reordered or rearranged without loss of compatibility with the present invention. For example, by using the first 40 bits to indicate ports and the next 16 bits to indicate switches, it is possible to have 40×16, or 640 ports on the network. In an additional example, by using a 128-bit CAM cycle word size, eight bits for administrative purposes, 104 bits for ports and 16 bits for switches, it is possible to have 104×16, or 1,664 ports on the network.

Figure 4:
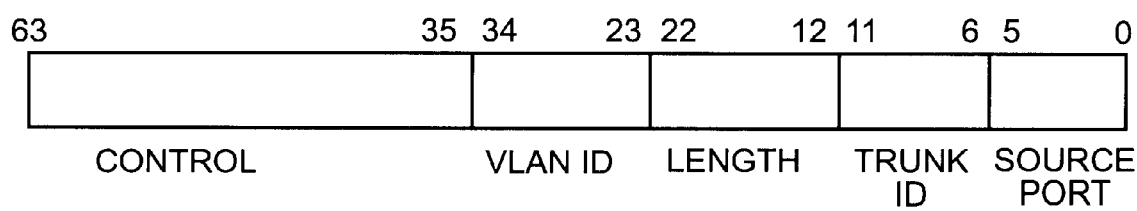
FIG. 4 shows a packet bus and stack header compatible with the present invention.
Figure 4:
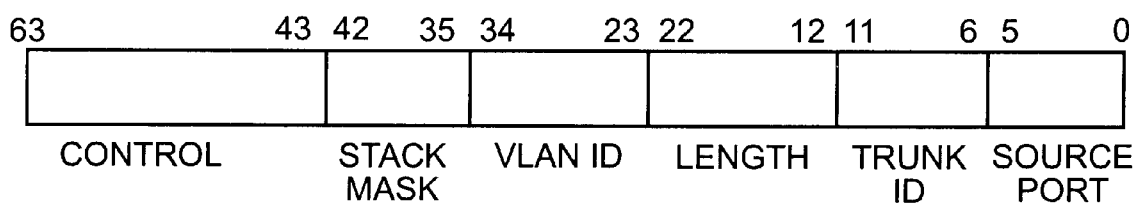
Figure 6:
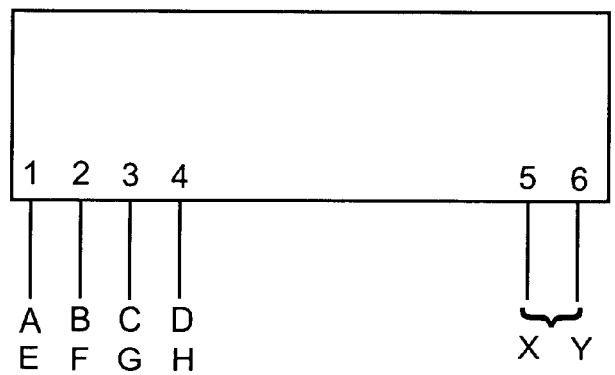
FIG. 6 is a data flow diagram of ingress port processing compatible with the present invention.

FIG. 4 shows an packet bus header and stack header which optimizes the memory of a network switch according to the present invention. In one embodiment of the present invention, a 64-bit header is used to indicate the source and destination stack only information for each set of data frames transmitted on the switch or stack. The header preferably provides six bits for the source port (SRC_PORT), shown as bits 44–49, and six bits for the destination port (DST_PORT), destination is only on the stack, this is ascertained from the cam cycle and appended to the stack header. The stack header is a combination of packet bus header and the cam cycle, shown as bits 50–55.

The description of the present invention uses an example 64-bit packet bus and stack header word for illustration purposes only. It will be recognized that the number of ports recognizable on a switch and the maximum number of switches on a network may be increased or decreased by changing size of the packet bus and stack header word or changing the contents of the packet bus and stack header word without loss of compatibility with the present invention. It will also be recognized that the contents of the packet bus and stack header word may be reordered or rearranged without loss of compatibility with the present invention.

Forwarding System Overview

In general, the type of processing that occurs in the present system can be broken down to the following sections: Port Ingress, Local CAM, Stack Egress/Ingress, Remote CAM, and Port Egress. The type of processing that occurs at each point is described in more detail below.

Port Ingress

The port ingress function is responsible for the proper reception and classification of packets. The information derived from this classification is reflected in the packet bus header that is provided by the port for each received packet. In general, the port provides the following functions:

Store and forward of packets from the physical interface to packet bus interface
Ingress port identification
Error detection and classification
Packet size indication
VLAN identification
Filtering Database Identification for shared VLANs
Multilink trunking membership identification
Spanning Tree state identification Local CAM The CAM function is responsible for the direction of packets towards their destination port or the filtering of packets that do not meet the forwarding criteria. The CAM accomplishes this by providing a CAM control word on the packet bus following the data phase of each packet transferred across the packet bus. This is referred to as the CAM cycle. There is significant functionality in the CAM to provide a rich set of features in the system. The CAM cycle is the end result of that processing. The CAM cycle provides the following information:

Egress port(s) identification
Flooded packet identification

The CAM function, described in greater detail below, provides the following features:

Storage of up to 32K unique 60 bit VLAN/MAC Address or address pairs indexed by a hash key
Natural learning of VLAN/MAC addresses at line rate
Known unicast address forwarding to learned port
Unknown unicast address flooding
Flooding of Broadcast and Unregistered Multicast packets
Support for forwarding registered multicast to port set
Support for port level egress VLAN filtering
Explicit Multilink Trunking support
Support of an 8K policy table that implements:
Up to 4K forwarding and filtering policies with no Multilink Trunk support
Up to 2K forwarding and filtering policies and up to 2 Multilink Trunks
Up to 1K forwarding and filtering policies with up to 6 Multilink Trunks
Ingress security for allowed ports based on SA Stack Egress/Ingress The stack interface subsystem is responsible for transferring packets across the stack to other switch units for further processing. The stack interface subsystem projects the packet bus information across the stack to maintain ingress and some local CAM data with the packet. The functions performed by the stack interface is:

Store and forward function onto the stack
Mapping other stack members into the local port space
Collapsing local ports onto the stack behind its stack address Remote CAM The remote CAM function provides all the functions of the local CAM function but is responsible for the secondary lookup that resolves a forwarding decision to one or more of its local ports. The two stage lookup that occurs in the CAM system has the local CAM resolving the packet forwarding decision to the address of a stack member. Upon reception of the packet by the remote stack member the remote CAM further resolves the forwarding decision to individual physical ports.

Port Egress

Port egress functions are the last step in the forwarding process. The egress port is responsible for accepting a packet off of the packet bus if it meets the egress criteria and forwarding it to the physical media for transmission. In particular the egress port provides the following functions:

Store and forward of packets from the packet bus to the physical interface
Tagging or not tagging packets with VLAN information based on certain criteria
Spanning tree blocked port support
Error checking on transmitted packets CAM Description A preferred CAM is incorporated by an application specific integrated circuit (ASIC). It is responsible for providing forwarding decisions for all packets appearing on the Packet Bus. The CAM operates by reading the packet header and DA/SA to formulate forwarding decisions.

As shown in FIG. 5, a preferred CAM utilizes the 64K×64 memory attached to the ASIC. The CAM memory is subdivided into four sections: Address entries, a policy table containing Forwarding/Filtering/Trunk Masks and two sets of VLAN filter masks.

Address entries are comprised of 96 bits and are grouped by four into a hash bucket yielding 8K hash buckets. Each hash bucket is comprised of six 64-bit words that contain the address information for the four address that are contained within. The address entries are not contiguous—four partial addresses are contained in the first two words and the remaining locations contain specific information for each of the four addresses including the remainder of the address and its VLAN tag. Specifically, the address entries contain the following information: 48 bits address, 12 bit VLAN tag, 13 bit policy, 4 bit trunk group and various other control bits as shown in FIG. 5.

The data contained in a valid entry is used along with data from the Packet Bus header to provide a forwarding decision. The forwarding decision is used to build a CAM cycle on the Packet Bus to steer the packet to its egress port(s). Table 1 below provides a list of CAM entry data.

TABLE 1

CAM Entry Data

| Data | Number of bits |
| --- | --- |
| MAC Address | 48 |
| VLAN tag | 12 |
| Policy | 13 |
| Source Port | 6 |
| Trunk Mask Group | 4 |
| DA Based | 1 |
| Filtered | 1 |

The fields and definitions of the CAM entry data shown in Table 1 are described in greater detail below.

MAC Address—This is the MAC address that matches either the DA or SA lookup. The same entry is used for both DA and SA though the remaining information in the entry is used in different ways.

VLAN Tag—VLAN tag from the packet the address was learned at. Each unique VLAN+SA creates a new CAM entry.

Policy—A 13 bit index used to access DA based policies for forwarding and filtering.

Source Port—The port number where this address was learned or migrated to. This is used for DA based forwarding.

Trunk Mask Group—A four bit field that is accessed by the SA lookup to build an index to a trunk mask. This is used to provide SA based conditioning on a forwarding mask that has multiple trunk ports activated.

DA Based—Indicates that this address should be forwarded without the use of a trunk mask, thus always sending it to the last port learned for this address.

Filtered—Indicates that the SA is filtered for this egress port based on static filtering information. This bit is updated from the filter mask every time it migrates.

CAM VLAN Table, Hash and Lookup

The CAM preferably uses a 61 bit hash that is comprised of the 48 bit MAC address along with 12 bits of the VLAN tag. The DA and SA are hashed in the same manner. Thus, if an address is learned in one VLAN as an SA, it will use the same CAM entry when the address is seen as a DA in a packet with the same VLAN tag. The resultant hash function creates a 61 bit result, from which a 13 bit remainder is selected as a hash bucket index.

During this phase of the CAM cycle, VLAN lookups are being performed into the two VLAN mask tables to prepare for the final CAM forwarding decision. The VLAN lookup returns a 64 bit value from both tables. This contains a 56 bit port mask that contains the registered ports for that VLAN.

Once the hash function generates lookup indices for the DA and SA the CAM memory is referenced. An exact match is performed against the four addresses stored in the hash bucket for both the DA and SA referenced buckets. If either the DA or SA do not create an exact match then a secondary lookup is performed using a modification of the hash remainder. Once a valid entry is confirmed secondary lookups are initiated to reference the policy table.

CAM Forwarding Decision

The CAM forwarding decision uses information from both the DA and SA lookup. The final result that is placed on the packet bus during the CAM cycle is a 56 bit port mask plus several control bits. The 56 bit port mask that results from the CAM Forwarding decision can be logically described as:

CAM Cycle Port Mask=VLAN MASK*TRUNK MASK*(FORWARDING MASK+PORT#`*`/Filtered)

Each element of the above equation is derived from the CAM entry, indirect mask accesses and the VLAN tag, and is described in greater detail below.

The VLAN port mask is a 56-bit value that is accessed from one of the two VLAN tables. The first is used for all known multicasts, known and unknown unicasts, the second VLAN table is used when the DA is an unknown multicast. Each of the two tables consists of 4K 56-bit entries that are directly referenced by the VLAN tag.

The trunk mask is accessed from the 8K policy table that is shared between the three types of port masks. The trunk mask is used to select one of up to four parallel paths in a multi-link trunk. The trunk mask is a function of the SA as well as the ingress port. More details are given below in the trunking section. The trunk mask can also be used to disallow a SA from forwarding out the switch by providing an all zeros default for unregistered addresses.

The forwarding mask is also accessed from the policy table and is used to force traffic on specific links. The forwarding mask is used in conjunction with the trunk mask to provide multi-link trunking. The forwarding mask defines all ports that are groved into a multi-link trunk. This defines all the possible paths to a destination. Therefore, it is referenced by a destination look up. The trunk mask is referenced by the packet source information which includes the source station address and packet ingress ports. Thus the exact port forwarding decision is the logical "and" of the trunk mask with the forwarding mask. The Forwarding mask is also used to implement the static table force function.

The port number vector expansion represents the port that the address was learned on as an SA.

The filtered bit represents the logical OR of two functions: 1) whether this address has been specified as filtered for the port it was learned on. This information is derived from the specific filter mask in the policy table. The filtered bit and forwarding mask implement the static table entry function of the 802.1q specification. 2) Whether the VLAN mask indicates that ingress port is not registered for that particular VLAN. The VLAN ingress registration check can be enabled on a per port basis within the CAM.

Unknown Destination Addresses

Unknown destination addresses are flooded, or sent out to all ports, based on whether they are multicast or unicast. The flooding occurs by setting the Forwarding mask to all ones and applying the SA referenced trunk mask. Different VLAN masks are used for unknown multicasts over unknown unicasts. The forwarding and trunk masks are used to generate the "all ports" mask that is then further constrained by the VLAN mask. The resultant vector is the port mask that identifies all the ports that this packet should be flooded on for the VLAN it is in.

Learning

The basic learning operation of the CAM occurs when the hashed (SA concatenated with VLAN indexes a CAM entry that is either empty or does not contain the address—VLAN pair as one of the valid addresses. In that case a new entry is created and has the 48 bit address, VLAN and the port it was seen on written into it. The CAM defaults are written to the other fields. The default filter action bit as set or cleared (filter or not) based on the global policy. The default policy is initialized to all zeros concatenated with up to the three most significant bits of the trunk ID from the packet bus header. The default trunk group is initialized to all 1's.

Migration

Migration is detected when a source address has moved from one port to another port unless the learned and migrated to port were part of the same trunk group. The single to single port migration is detected when the source port number changes. The Trunk migration occurs when the Trunk ID changes. When a migration is detected the CAM updates the port number (non-trunked), trunk bits in the policy, filtered bit from the filter mask pointed to by the policy.

Stack Addressing and Collapsed Ports

The CAM architecture provides for stacking multiple units together to emulate a single switch. To extend the port addressing capabilities of the system, the CAM cycle provides special meaning for the upper 8 bits of the 56 bit port vector. These 8 bits represent the stack port vector—one for each member of the stack. Thus, to send a packet over the stack to another unit, the CAM sets the corresponding bit in stack port vector.

Addresses are learned from remote units with the remote unit's stack address rather than the port number that the packet came in originally. The effect here is to collapse or "hide" all the remote ports behind the stack address of the unit they are on. It is the responsibility of the local CAM on each unit to further resolve the forwarding decision of a packet received from the stack. When a CAM has learned an address on one of its local ports or has a registered address that resolves to a local port it is said to "own" that address with respect to the system.

Trunking

The trunking capabilities of the CAM architecture will support up to six trunks group with each trunk supporting up to four trunk members. There are two basic switching requirements for trunking. The first is the ability to treat multiple links as a single one for the purposes of learning and migration, and the second is to be able to select one of the member paths as the destination for a forwarding decision with no duplicate packets sent. Forwarding decisions in the CAM architecture allow the path selection in a trunk group to be based on one of the following:

A single port associated with the DA—this can be either learned or programmed.

Any port in the trunk group where that DA has been learned or programmed. The port selection is conditioned by the SA and/or the ingress port of the specific packet.

There are three basic components involved in the trunking forwarding operation. These are the Trunk Identifier, the Policy Index and the Trunk Mask Group, described in greater detail below.

Trunk Identifier

The Trunk Identifier is assigned to ports to indicate that they are members of a trunk group or to assign non-trunked ports an offset to a trunk mask index. The identifier is 6 bits and is assigned on a per port basis. This identifier appears in the packet bus header for each packet and is used by the CAM as part of the policy index into the policy table. It is defined as:

| Bit | 5 4 3 2 | 1 0 |
|---|---|---|
| Definition | Policy Index | Port ID |

Bit 5 indicates whether the trunk identifier is part of a trunk group or a trunk mask offset. When bit 5 is zero, the Trunk Identifier is used as a trunk mask offset:

| Bit | 5 | 4 3 2 | 1 0 |
|---|---|---|---|
| Definition | 0 | Unit Id | Port ID |

When bit is one, the Trunk Identifier is indicating trunk group membership.

| Bit | 5 | 4 3 2 | 1 0 |
|---|---|---|---|
| Definition | 1 | Trunk Group ID | Port ID |

The values 000000 to 011111 are assigned to identify non-trunked ports and used to offset into trunk masks. The values 101000 to 111111 are used for trunks—Either two or six trunks are allowed as shown below in Table 2:

TABLE 2

Trunk ID Definition

| Trunk ID | Two Trunks | Six Trunks |
|---|---|---|
| 1000XX | Not Used | Not Used |
| 1001XX | Not Used | Not Used |
| 1010XX | Trunk group 1 | Trunk group 1 |
| 1011XX | Trunk group 2 | Trunk group 2 |
| 1100XX | Not Used | Trunk group 3 |
| 1101XX | Not Used | Trunk group 4 |
| 1110XX | Not Used | Trunk group 5 |
| 1111XX | Not Used | Trunk group 6 |

DA Referenced Policy

The CAM architecture supports a selection of three different trunking configurations: no trunks, two trunk groups and six trunk groups. Each of these configurations has effects on the organization of the policy table. When no trunks are configured, the table can hold 4K policies, where each policy contains a forwarding mask and a filter mask. The two trunk configuration reduces the available policies to 2K, with each policy containing 3 forwarding masks and a filter mask. The six trunk configuration further reduces the policies available to 1K with each policy containing 7 forwarding masks and a filter mask.

The CAM entry contains a 13 bit policy index field per MAC address. The DA references the policy index to provide the forwarding mask that defines the port set for the trunk group that the address is known on. This policy field is stored in one of three formats. If the SA is learned or registered to a non-trunk port, or trunking is disabled the 13 bits contain a 12 bit policy index (4K policies). If the address is learned or registered to a trunk group, assuming trunking is enabled, the LSB's are modified by the trunk group identifier.

TABLE 3

Policy Index Definition

| Address type | 12 11 10 9 8 7 6 5 4 3 | 2 | 1 | 0 |
|---|---|---|---|---|
| Non-Trunk | Policy (4K available) | | | |
| 2 Trunk | Policy | | | Trunk Group ID |
| 6 Trunk | Policy | | Trunk Group ID | |

Trunk Mask Group Identifier

The Trunk Mask Group ID is the third component of the trunking mechanism. The Trunk Mask Group ID is referenced by the SA lookup of the CAM entry. The four bits are assigned to each SA to allow it to select from a set of Trunk Masks. The index into the Trunk Mask Table is comprised of the Trunk Mask Group ID, the Trunk Group ID/Unit ID and some fixed bits. The Trunk Mask Index is defined below in Table 4:

TABLE 4

Trunk Mask Index Definition

| | 12 11 10 | 9 8 7 6 | 5 4 3 2 | 1 0 |
|---|---|---|---|---|
| Trunk Mask Index | 1 1 1 | Trunk Mask Group ID | Trunk Group/Unit ID | Port ID |

The Policy Table

The policy table is organized in three different ways based on no trunks, 2 trunks and 6 trunks. The trunk configuration selects the organizations. For no trunks the table is fully populated with forward/filter policies as defined below in Table 5:

TABLE 5

Policy Table with No Trunking and 4K Policies

| Address | | Contents | Definition |
|---|---|---|---|
| 12 11 10 9 8 7 6 5 4 3 2 1 | 0 | | |
| 0 0 0 0 0 0 0 0 0 0 0 0 | 0 | Forwarding mask 0 | Policy 0 |
| 0 0 0 0 0 0 0 0 0 0 0 0 | 1 | Filter Mask 0 | |
| 0 0 0 0 0 0 0 0 0 0 0 1 | 0 | Forwarding mask 1 | Policy 1 |
| 0 0 0 0 0 0 0 0 0 0 0 1 | 1 | Filter Mask 1 | |
| . | . | . | |
| . | . | . | |
| . | . | . | |
| 1 1 1 1 1 1 1 1 1 1 1 0 | 0 | Forwarding mask 4094 | Policy 4094 |
| 0 0 0 0 0 0 0 0 0 0 0 0 | 1 | Filter Mask 4094 | |
| 0 0 0 0 0 0 0 0 0 0 0 1 | 0 | Forwarding mask 4095 | Policy 4095 |
| 1 1 1 1 1 1 1 1 1 1 1 1 | 1 | Filter Mask 4095 | |

When trunking is enabled, the trunk masks are also stored in the policy table. Trunk masks grow from the top of the table (highest addresses) and forward/filter policies grow from the bottom (lowest addresses). The policy table can hold up to 1K trunk masks. These take away from the maximum number of forward/filter that can be realized. This is shown below in Table 6 and Table 7.

TABLE 6

Policy Table with 2 Trunks and 2K Policies

| Address | | Contents | Definition |
|---|---|---|---|
| 12 11 10 9 8 7 6 5 4 3 2 | 1 0 | | |
| 0 0 0 0 0 0 0 0 0 0 0 | 0 0 | Forwarding mask 0 - Not Trunked | Policy 0 |
| 0 0 0 0 0 0 0 0 0 0 0 | 0 1 | Filter Mask 0 | |
| 0 0 0 0 0 0 0 0 0 0 0 | 1 0 | Forwarding mask 0 - Trunk 0 | |
| 0 0 0 0 0 0 0 0 0 0 1 | 1 1 | Forwarding mask 0 - Trunk 1 | |
| 0 0 0 0 0 0 0 0 0 0 1 | 0 0 | Forwarding mask 1 - Not Trunked | Policy 1 |
| 0 0 0 0 0 0 0 0 0 0 1 | 0 1 | Filter Mask 1 | |
| 0 0 0 0 0 0 0 0 0 0 1 | 1 0 | Forwarding mask 1 - Trunk 0 | |
| 0 0 0 0 0 0 0 0 0 0 1 | 1 1 | Forwarding mask 1 - Trunk 1 | |
| . | . | . | . |
| . | . | . | . |
| . | . | . | . |
| 1 1 1   1111   1 1 1 0 | 1 1 | Trunk Mask 1019 | |
| 1 1 1   1111   1 1 1 1 | 0 0 | Trunk Mask 1020 | |
| 1 1 1   1111   1 1 1 1 | 0 1 | Trunk Mask 1021 | |
| 1 1 1   1111   1 1 1 1 | 1 0 | Trunk Mask 1022 | |
| 1 1 1   1111   1 1 1 1 | 1 1 | Trunk Mask 1023 | |
| 12 11 10   9 8 7 6   5 4 3 2 | 1 0 | Contents | |

TABLE 7

Policy Table with 6 Trunks and 1K Policies

| Address | | Contents | Definition |
|---|---|---|---|
| 12 11 10 9 8 7 6 5 4 3 | 2 1 0 | | |
| 0 0 0 0 0 0 0 0 0 0 | 0 0 0 | Forwarding mask 0 - Not Trunked | Policy 0 |
| 0 0 0 0 0 0 0 0 0 0 | 0 0 1 | Filter Mask 0 | |
| 0 0 0 0 0 0 0 0 0 0 | 0 1 0 | Forwarding mask 0 - Trunk 0 | |
| 0 0 0 0 0 0 0 0 0 0 | 0 1 1 | Forwarding mask 0 - Trunk 1 | |
| 0 0 0 0 0 0 0 0 0 0 | 1 0 0 | Forwarding mask 0 - Trunk 2 | |
| 0 0 0 0 0 0 0 0 0 0 | 1 0 1 | Forwarding mask 0 - Trunk 3 | |
| 0 0 0 0 0 0 0 0 0 0 | 1 1 0 | Forwarding mask 0 - Trunk 4 | |
| 0 0 0 0 0 0 0 0 0 0 | 1 1 1 | Forwarding mask 0 - Trunk 5 | |
| 0 0 0 0 0 0 0 0 0 1 | 0 0 0 | Forwarding mask 1 - Not Trunked | Policy 1 |
| 0 0 0 0 0 0 0 0 0 1 | 0 0 1 | Filter Mask 1 | |
| 0 0 0 0 0 0 0 0 0 1 | 0 1 0 | Forwarding mask 1 - -Trunk 0 | |
| 0 0 0 0 0 0 0 0 0 1 | 0 1 1 | Forwarding mask 1 - Trunk 1 | |
| 0 0 0 0 0 0 0 0 0 1 | 1 0 0 | Forwarding mask 1 - Trunk 2 | |
| 0 0 0 0 0 0 0 0 0 1 | 1 0 1 | Forwarding mask 1 - Trunk 3 | |
| 0 0 0 0 0 0 0 0 0 1 | 1 1 0 | Forwarding mask 1 - Trunk 4 | |
| 0 0 0 0 0 0 0 0 0 1 | 1 1 1 | Forwarding mask 1 - Trunk 5 | |
| . . . | . . . | . | |
| 1 1 1    1 1 1 1    1 1 1 0 | 1 1 | Trunk Mask 1019 | |
| 1 1 1    1 1 1 1    1 1 1 1 | 0 0 | Trunk Mask 1020 | |
| 1 1 1    1 1 1 1    1 1 1 1 | 0 1 | Trunk Mask 1021 | |
| 1 1 1    1 1 1 1    1 1 1 1 | 1 0 | Trunk Mask 1022 | |
| 1 1 1    1 1 1 1    1 1 1 1 | 1 1 | Trunk Mask 1023 | |
| 12 11 10    9 8 7 6    5 4 3 2 | 1 0 | Contents | |

Trunking Operation

Figure 7:
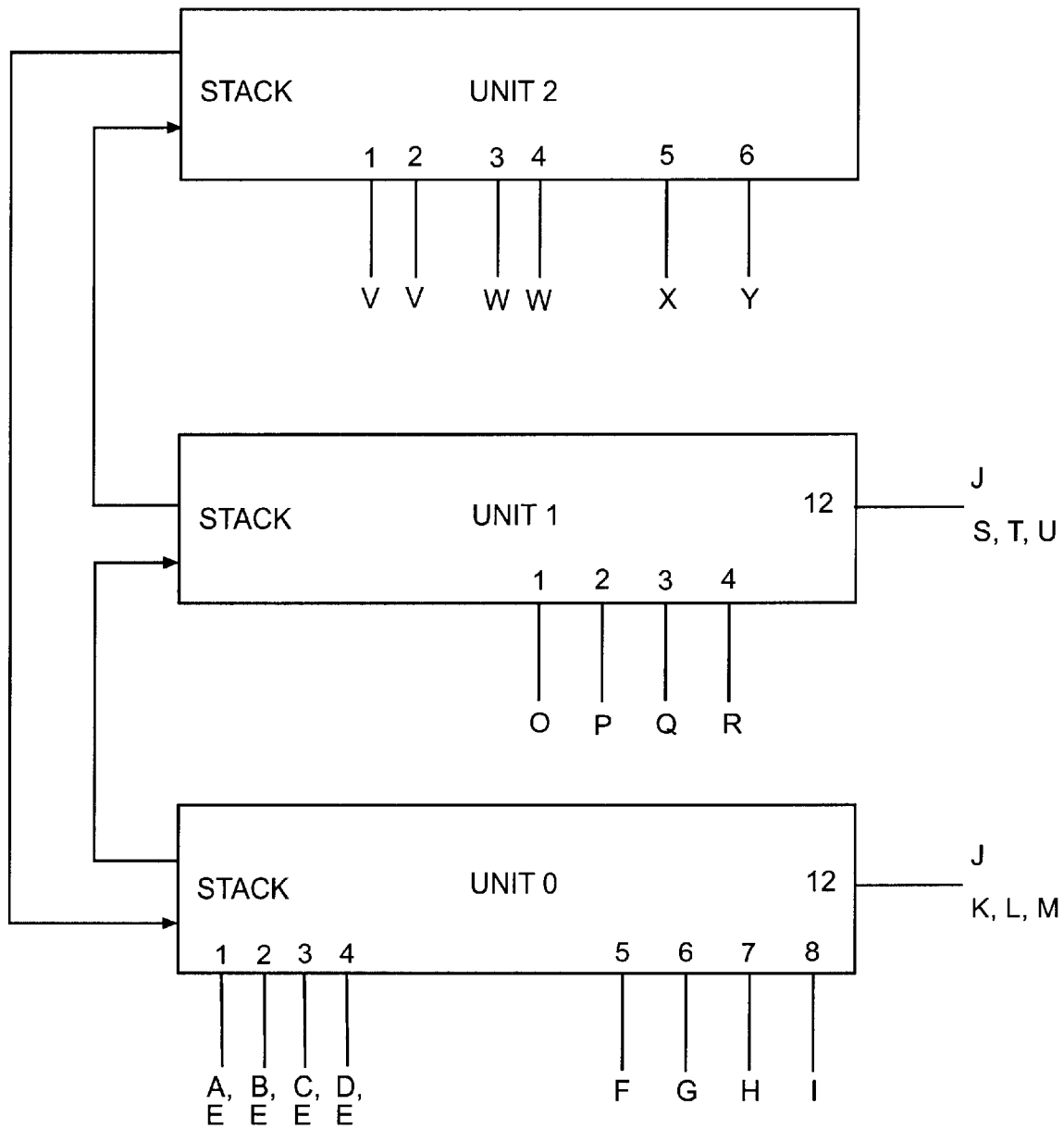
FIG. 7 shows an example network system compatible with the present invention.

The basic operation of trunking can be explained using the methods described above. The system shown in FIG. 7 represents a three unit stack with four trunks defined. This requires that the policy table be configured for six trunks and 1K policies. Unit 0 contains Trunk 0, a bounded trunk comprised of ports 1, 2, 3 and 4. Unit 2 contains two bounded trunks each with two links as trunk members. Ports 1 and 2 comprise Trunk 1 and ports 3 and 4 comprise Trunk 2. The final trunk, Trunk 3, is a distributed trunk with two trunk members, port 12 on both Unit 0 and 1. The remaining ports are singular and not members of any trunks.

Referring to the mechanisms described above—the trunk group identifier, DA referenced policy and Trunk Mask Id, the units can be configured as follows. The first assignment is the Trunk ID for each port in the system. This requires that the overall stack be initialized and that trunk assignments across the stack be consistent and synchronized such that no duplicate assignments are made. Once the ports are assigned to Trunk Ids, the policy tables on each CAM must be initialized to correspond with the desired trunking operation.

TABLE 8

Unit 0 Trunk ID Assignments

| Port # | Trunk Group ID or Unit ID | Port ID |
|---|---|---|
| 1 | 1010 | 00 |
| 2 | 1010 | 01 |
| 3 | 1010 | 10 |
| 4 | 1010 | 11 |
| 5 | 0000 | 00 |
| 6 | 0000 | 01 |
| 7 | 0000 | 01 |

TABLE 8-continued

Unit 0 Trunk ID Assignments

| Port # | Trunk Group ID or Unit ID | Port ID |
|---|---|---|
| 8 | 0000 | 11 |
| 12 | 1101 | 00 |

TABLE 9

Unit 1 Trunk ID Assignments

| Port # | Trunk Group ID or Unit ID | Port ID |
|---|---|---|
| 1 | 0001 | 00 |
| 2 | 0001 | 00 |
| 3 | 0001 | 11 |
| 4 | 0001 | 11 |
| 12 | 1101 | 01 |

TABLE 10

Unit 2 Trunk ID Assignments

| Port # | Trunk Group ID or Unit ID | Port ID |
|---|---|---|
| 1 | 1011 | 00 |
| 2 | 1011 | 01 |
| 3 | 1100 | 00 |
| 4 | 1100 | 01 |
| 5 | 0010 | 00 |
| 6 | 0010 | 11 |

The policy tables must define the forwarding masks and trunk masks for each unit's local CAM. For the purpose of illustration and to keep the example port vectors small, the example system is defined to support only 12 local ports and 4 stack ports with a 16 bit port mask. Table 11 below corresponds to FIG. 7. The example system must also have a global policy as to whether units that are sending packets to distributed trunks utilize a single trunk member per source unit or load balance across members of the trunk group. The first option always sends packets to the trunk link on same unit for a destination trunk no matter what ingress port or source address. This also pertains to the case where the local ports always send to the local trunk member. The other option is to have different ports or source addresses on the ingress unit send to different members of a distributed trunk group.

This affects the forwarding masks for distributed trunks on the ingress box. If the first policy of using only the local trunk link member is chosen then the forwarding mask for destination trunks that are distributed always has one and only one path available—either the local port for locally originated packets or one unit that has a member of the trunk group.

For the option that allows different egress per source port/address, the forwarding masks have all possible egress paths enabled. The local lookup then applies a trunk mask to disable a local path. The implication of this is that extra bandwidth is utilized on the stack to accomplish this load balancing. In the example given Unit 2 can load balance between Unit 0 and Unit 1 for Trunk 3. The trunk masks on Unit 2 must be set up to allow both units to be valid egress paths for ingress packets—otherwise non-trunked ports on the other units could never be egress ports. But to do so requires that the CAMs in both Unit 0 and Unit 2 must be set up to filter the trunk ports based on ingress port/source address. This causes packets for distributed trunk destinations to be received by both units and one unit to filter locally while the other transmits the packet. The wasted bandwidth is the packet bus bandwidth of the unit that filters the packet.

TABLE 11

CAM Policy Tables

| Address | Contents CAM 0 | Contents CAM 1 | Contents CAM 2 | Note |
|---|---|---|---|---|
| 0 0000 0000 0 000 | 0000 0000 0000 0000 | 0000 0000 0000 0000 | 0000 0000 0000 0000 | Default Forwarding Mask |
| 0 0000 0000 0 001 | 0000 0000 0000 0000 | 0000 0000 0000 0000 | 0000 0000 0000 0000 | Default Filter Mask |
| 0 0000 0000 0 010 | 0000 0000 0000 1111 | 0001 0000 0000 0000 | 0001 0000 0000 0000 | Default Fwd Mask - Trunk 0 |
| 0 0000 0000 0 011 | 0100 0000 0000 0000 | 0100 0000 0000 0000 | 0000 0000 0000 0011 | Default Fwd Mask - Trunk 1 |
| 0 0000 0000 0 100 | 0100 0000 0000 0000 | 0100 0000 0000 0000 | 0000 0000 0000 1100 | Default Fwd Mask - Trunk 2 |
| 0 0000 0000 0 101 | 0000 1000 0000 0000 | 0000 1000 0000 0000 | 0010 0000 0000 0000 | Default Fwd Mask - Trunk 3 |
| 0 0000 0000 0 110 | 0000 0000 0000 0000 | 0000 0000 0000 0000 | 0000 0000 0000 0000 | Default Fwd Mask - Trunk 4 |
| 0 0000 0000 0 111 | 0000 0000 0000 0000 | 0000 0000 0000 0000 | 0000 0000 0000 0000 | Default Fwd Mask - Trunk 5 |
| 0 0000 0000 1 000 | 0000 0000 0000 0000 | 0000 0000 0000 0000 | 0000 0000 0000 0000 | Forwarding Mask 1 |
| 0 0000 0000 1 001 | 0000 0000 0000 0000 | 0000 0000 0000 0000 | 0000 0000 0000 0000 | Filter Mask 1 |
| 0 0000 0000 1 010 | 0000 0000 0000 1111 | 0001 0000 0000 0000 | 0001 0000 0000 0000 | Fwd Mask 1 - Trunk 0 |
| 0 0000 0000 1 011 | 0100 0000 0000 0000 | 0100 0000 0000 0000 | 0000 0000 0000 0011 | Fwd Mask 1 - Trunk 1 |
| 0 0000 0000 1 100 | 0100 0000 0000 0000 | 0100 0000 0000 0000 | 0000 0000 0000 1100 | Fwd Mask 1 - Trunk 2 |
| 0 0000 0000 1 101 | 0000 1000 0000 0000 | 0000 1000 0000 0000 | 0010 0000 0000 0000 | Fwd Mask 1 - Trunk 3 |
| 0 0000 0000 1 110 | 0000 0000 0000 0000 | 0000 0000 0000 0000 | 0000 0000 0000 0000 | Fwd Mask 1 - Trunk 4 |
| 0 0000 0000 1 111 | 0000 0000 0000 0000 | 0000 0000 0000 0000 | 0000 0000 0000 0000 | Fwd Mask 1 - Trunk 5 |
| . | . | . | . | . |
| 111 1111 0000 00 | 0110 1000 1111 0001 | 0000 1000 0000 1111 | 0000 0000 0011 0101 | Default Trnk Mask - Box 0 Port 0 |
| 111 1111 0000 01 | 0110 1000 1111 0010 | 0000 1000 0000 1111 | 0000 0000 0011 0101 | Default Trnk Mask - Box 0 Port 1 |
| 111 1111 0000 10 | 0110 1000 1111 0100 | 0000 1000 0000 1111 | 0000 0000 0011 1010 | Default Trnk Mask - Box 0 Port 2 |
| 111 1111 0000 11 | 0110 1000 1111 1000 | 0000 1000 0000 1111 | 0000 0000 0011 1010 | Default Trnk Mask - Box 0 Port 3 |
| 111 1111 0001 00 | 0000 1000 1111 0001 | 0101 1000 0000 1111 | 0000 0000 0011 0101 | Default Trnk Mask - Box 1 Port 0 |
| 111 1111 0001 01 | 0000 1000 1111 0010 | 0101 1000 0000 1111 | 0000 0000 0011 0101 | Default Trnk Mask Box 1 Port 1 |
| 111 1111 0001 10 | 0000 1000 1111 0100 | 0101 1000 0000 1111 | 0000 0000 0011 1010 | Default Trnk Mask - Box 1 Port 2 |
| 111 1111 0001 11 | 0000 1000 1111 1000 | 0101 1000 0000 1111 | 0000 0000 0011 1010 | Default Trnk Mask - Box 1 Port 3 |
| 111 1111 0010 00 | 0000 1000 1111 0001 | 0000 1000 0000 1111 | 0011 0000 0011 0101 | Default Trnk Mask - Box 2 Port 0 |
| 111 1111 0010 01 | 0000 1000 1111 0010 | 0000 1000 0000 1111 | 0011 0000 0011 0101 | Default Trnk Mask - Box 2 Port 1 |
| 111 1111 0010 10 | 0000 1000 1111 0100 | 0000 1000 0000 1111 | 0011 0000 0011 1010 | Default Trnk Mask - Box 2 Port 2 |
| 111 1111 0010 11 | 0000 1000 1111 1000 | 0000 1000 0000 1111 | 0011 0000 0011 1010 | Default Trnk Mask - Box 2 Port 3 |
| . | . | . | . | . |
| 111 1111 1010 00 | 0110 1000 1111 0000 | 0000 0000 0000 1111 | 0000 0000 0011 0101 | Default Trnk Mask - Trnk 0 Port 0 |
| 111 1111 1010 01 | 0110 1000 1111 0000 | 0000 0000 0000 1111 | 0000 0000 0011 0101 | Default Trnk Mask - Trnk 0 Port 1 |
| 111 1111 1010 10 | 0110 1000 1111 0000 | 0000 0000 0000 1111 | 0000 0000 0011 1010 | Default Trnk Mask - Trnk 0 Port 2 |
| 111 1111 1010 11 | 0110 1000 1111 0000 | 0000 0000 0000 1111 | 0000 0000 0011 1010 | Default Trnk Mask - Trnk 0 Port 3 |
| 111 1111 1011 00 | 0000 0000 1111 0001 | 0000 1000 0000 1111 | 0011 0000 0011 0100 | Default Trnk Mask - Trnk 1 Port 0 |
| 111 1111 1011 01 | 0000 0000 1111 0010 | 0000 1000 0000 1111 | 0011 0000 0011 1000 | Default Trnk Mask - Trnk 1 Port 1 |
| 111 1111 1011 10 | 0000 0000 1111 0100 | 0000 1000 0000 1111 | 0011 0000 0011 0100 | Default Trnk Mask - Trnk 1 Port 2 |
| 111 1111 1011 11 | 0000 0000 1111 1000 | 0000 1000 0000 1111 | 0011 0000 0011 1000 | Default Trnk Mask - Trnk 1 Port 3 |
| 111 1111 1100 00 | 0000 0000 1111 0001 | 0000 1000 0000 1111 | 0011 0000 0011 0001 | Default Trnk Mask - Trnk 2 Port 0 |
| 111 1111 1100 01 | 0000 0000 1111 0010 | 0000 1000 0000 1111 | 0011 0000 0011 0010 | Default Trnk Mask - Trnk 2 Port 1 |
| 111 111T 1100 10 | 0000 0000 1111 0100 | 0000 1000 0000 1111 | 0011 0000 0011 0001 | Default Trnk Mask - Trnk 2 Port 2 |
| 111 1111 1100 11 | 0000 0000 1111 1000 | 0000 1000 0000 1111 | 0011 0000 0011 0010 | Default Trnk Mask - Trnk 2 Port 3 |
| 111 1111 1101 00 | 0000 0000 1111 0001 | 0101 0000 0000 1111 | 0000 0000 0011 0101 | Default Trnk Mask - Trnk 3 Port 0 |
| 111 1111 1101 01 | 0000 0000 1111 0010 | 0101 0000 0000 1111 | 0000 0000 0011 0101 | Default Trnk Mask - Trnk 3 Port 1 |

TABLE 11-continued

CAM Policy Tables

| Address | Contents CAM 0 | Contents CAM 1 | Contents CAM 2 | Note |
|---|---|---|---|---|
| 111 1111 1101 10 | 0000 0000 1111 0100 | 0101 0000 0000 1111 | 0000 0000 0011 1010 | Default Trnk Mask - Trnk 3 Port 2 |
| 111 1111 1101 11 | 0000 0000 1111 1000 | 0101 0000 0000 1111 | 0000 0000 0011 1010 | Default Trnk Mask - Trnk 3 Port 3 |
| . | . | . | . | . |
| . | . | . | . | . |
| . | . | . | . | . |

While the invention is described in terms of preferred embodiments in a specific system environment, those of ordinary skill in the art will recognize that the invention can be practiced, with modification, in other and different hardware and software environments within the spirit and scope of the appended claims.

What is claimed is:

1. In a data communications network, a method of communicating between a source station having multiple connections to a first switch and a destination station having multiple connections to a second switch comprising the steps of:

assigning a trunk identifier to each port on the first switch;

encoding a data frame with the trunk identifier for an ingress port on the first switch and sending the data frame to the second switch;

receiving the data frame on the second switch, the data frame containing a source address, destination address and the trunk identifier;

obtaining a list of egress ports for the destination station from a station list contained in the second switch;

selecting an egress port from the list of egress ports based upon the source address, destination address and trunk identifier; and sending the data frame to the destination station through the selected egress port.

2. The method of claim 1 further comprising the step of updating the station list contained in the second switch to indicate that the trunk identifier is associated with the destination station.

3. The method of claim 1 further comprising the step of updating a station list contained in the first switch to indicate that the trunk identifier is associated with the destination station.

4. The method of claim 1 further comprising the step of updating the station list contained in the second switch to indicate that the selected egress port is associated with the destination station.

5. The method of claim 1 wherein the step of encoding the data frame with an identifier for the ingress port on the first switch comprises encoding trunk port bits of the data frame with a numerical value corresponding to the ingress port.

6. A network apparatus comprising:

a plurality of stackable switches including an ingress port coupled to receive a data frame from a source station and a plurality of egress ports coupled to the ingress port; and a memory coupled to the ingress port and the plurality of egress ports containing a station list having a list of egress ports for a destination station corresponding to one or more of the plurality of egress ports.

7. The apparatus of claim 6 further comprising a selector coupled to the memory to select a destination egress port from the list of egress ports based on a source address, destination address, and a trunk identifier.

8. The apparatus of claim 7 wherein the trunk identifier indicates that the destination egress port is a member of a trunk group.

9. The apparatus of claim 7 wherein the trunk identifier assigns an offset to a trunk mask index to the destination egress port.

10. The apparatus of claim 6 further comprising an encoder coupled to the ingress port to encode the data frame with the trunk identifier.

11. The apparatus of claim 6 further comprising an updater coupled to the memory to update the station list to indicate that the trunk identifier is associated with the destination station.

12. The apparatus of claim 6 further comprising an updater coupled to the memory to update the station list to indicate that the egress port is associated with the destination station.

13. A method of communicating in a data communications network between a source station having multiple connections to a first switch and a destination station having multiple connections to a second switch, comprising the steps of:

assigning a trunk identifier to each port on the first switch;

encoding a data frame with the trunk identifier for an ingress port on the first switch and sending the data frame to the second switch;

receiving the data frame on the second switch, the data frame containing a source address, destination address, and the trunk identifier;

obtaining a list of egress ports for the destination station from a station list contained in the second switch;

selecting an egress port from the list of egress ports based on the source address, destination address, and trunk identifier; and sending the data frame to the destination station through the selected egress port.

14. A network comprising:

a first switch operatively connected to a source station by a plurality of connections through a plurality of ingress ports, each port comprising a trunk identifier, said first switch encoding a data frame with the trunk identifier for a given ingress port;

a second switch operatively connected to a destination station by a plurality of connections and comprising a station list comprising a list of egress ports for the destination station;

said first switch sending the data frame to said second switch;

said second switch receiving the data frame and reading therefrom a destination address; and said second switch selecting an egress port from the list of egress ports based on a source address, the destination address, and the trunk identifier, and sending the data frame to the destination station through the selected egress port.

* * * * *